United States Patent
Feleppa

(10) Patent No.: US 6,264,394 B1
(45) Date of Patent: Jul. 24, 2001

(54) DUAL PURPOSE FLANGED CONNECTOR

(76) Inventor: Richard Feleppa, 12633 Lady Fern Cir., Boca Raton, FL (US) 33428

( * ) Notice: Subject to any disclaimer, the term of this patent is extended or adjusted under 35 U.S.C. 154(b) by 0 days.

(21) Appl. No.: 09/524,598

(22) Filed: Mar. 14, 2000

(51) Int. Cl.[7] ............... B25G 3/02; F16B 3/02; F16D 1/00
(52) U.S. Cl. ............ 403/362; 248/519; 403/337
(58) Field of Search .................... 403/362, 199, 403/263, 306, 388, 230, 233, 337; 248/519, 523, 539, 136

(56) References Cited

U.S. PATENT DOCUMENTS

| | | | |
|---|---|---|---|
| 890,319 | 6/1908 | Wells . | |
| 1,977,343 | * 10/1934 | Matthes | 403/306 |
| 2,606,777 | * 8/1952 | Wilson | 403/362 |
| 2,935,896 | * 5/1960 | Simon | 403/362 |
| 3,436,047 | * 4/1969 | Foltz | 248/317 |
| 4,480,941 | * 11/1984 | Gilb et al. | 403/232.1 |
| 5,468,086 | * 11/1995 | Goya | 403/260 |
| 5,826,850 | 10/1998 | Goldsmith . | |
| 5,895,168 | * 4/1999 | Liao | 403/362 |
| 6,129,322 | * 10/2000 | Merkl | 248/213.2 |

* cited by examiner

Primary Examiner—Lynne H. Browne
Assistant Examiner—John B. Walsh
(74) Attorney, Agent, or Firm—Alvin S. Blum

(57) ABSTRACT

A flanged connector for removably fastening an elongate rod or tube to a flat surface has two modes of operation. The connector has a flange with a flat bottom and a tubular member extending up from the base. In a first mode, the flanged base is fastened to the surface with the tubular member upstanding to receive the rod in a central passage. A threaded aperture in the wall of the tubular member receives a set screw that advances transversely through the wall to engage the rod and secure it in place. In a second mode, the connector is inverted and mounted below the support surface with the flat face of the base in a common plane with the support surface. A set screw that passes at an acute angle to the passage axis extends from the flat face to the central passage to secure the rod. When the rod is removed, the support surface is unobstructed.

8 Claims, 2 Drawing Sheets

DUAL PURPOSE FLANGED CONNECTOR

BACKGROUND OF THE INVENTION

This invention relates to connectors, and more particularly to a rigid flanged connector for removably attaching an elongate rod or tube to a flat surface.

DESCRIPTION OF THE PRIOR ART

Flanged connectors for attaching a rod, or tube, to a flat surface are well known in the art. They generally provide a rigid flange with a flat bottom for attaching to a flat support surface with screws that pass through holes in the flange. Upstanding from the flange is a tubular member for receiving the rod. A screw in the wall of tubular member is tightened onto the rod to hold it securely in place.

SUMMARY OF THE INVENTION

This arrangement is unsatisfactory when the rod is removed and the support surface must be free of obstructions. In that situation, it would be desirable to have a connector that would have a tubular member that would be buried in the support to-present a substantially uniformly flat support surface when the rod is removed. It would be even more useful to have a connector that could be used in both the tubular member upstanding and tubular member buried configurations.

It is accordingly an object of the invention to provide a connector for removably securing a cylindrical rod or tube to a flat support surface that may be used in both the tubular member upstanding and buried configurations.

The connector of the invention comprises a flange base with holes for screws. The base has a flat bottom. A tubular member is upstanding from the base with a threaded aperture through its wall to receive a screw to secure the rod as in the prior art. A second threaded aperture carries a screw from the flat bottom of the base to the rod at an acute angle to the axis of the rod. This screw may be accessed from the flat bottom of the base when the connector is inverted with the flat bottom of the base in the plane of the flat support surface and the balance of the connector buried below the surface. When the rod is removed from the connector in this configuration, the flat support surface is unobstructed.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 3:
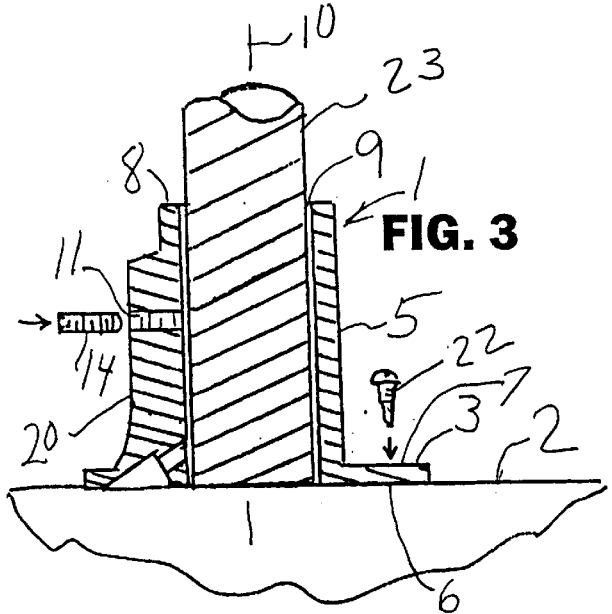
FIG. 3 is a sectional view taken through line 3—3 of FIG. 1.

Referring now first to the drawing FIGS. 1–4, the connector 1 of the invention comprises a rigid broad base 3 that may be fastened to a flat support surface 2 by means of screws 22 through holes 19, as best seen in FIG. 3. A rigid tubular member 5 with free end 8 is upstanding from base 3. A central passage 9 with axis 10 extends from the free end down through the tubular member 5 and the base 3 to the first face 6 for receiving therein an elongate rod or tube 23. The rod is secured within the passage by means of the hex socket set screw 14 inserted into the at-least-partially-threaded aperture 11 that is disposed transverse to the passage axis 10. A long boss 20 extends along one side of the tubular member 5. Aperture 11 passes through the boss.

Figure 1:
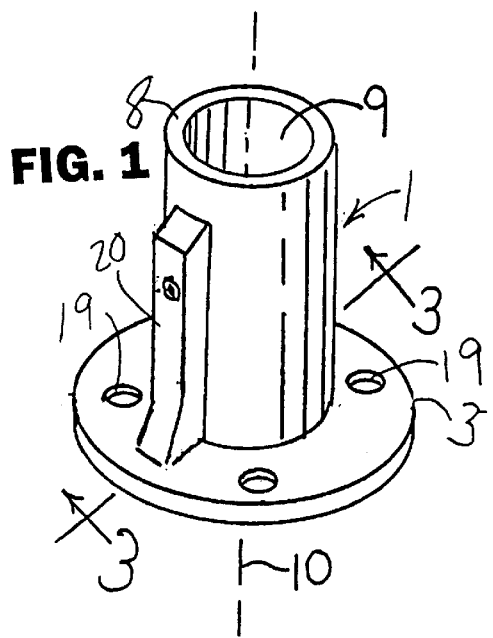
FIG. 1 is a perspective view of the connector of the invention upright.
Figure 2:
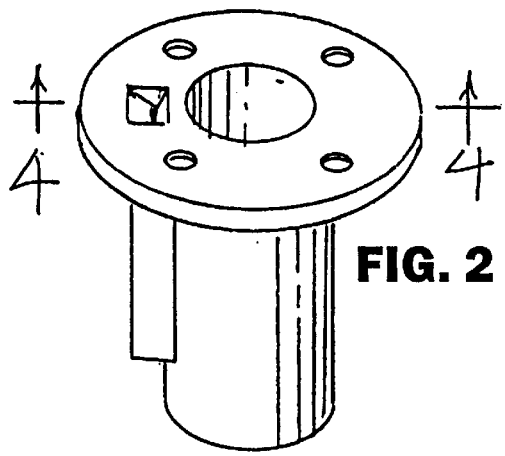
FIG. 2 is a perspective view of the connector inverted.
Figure 4:
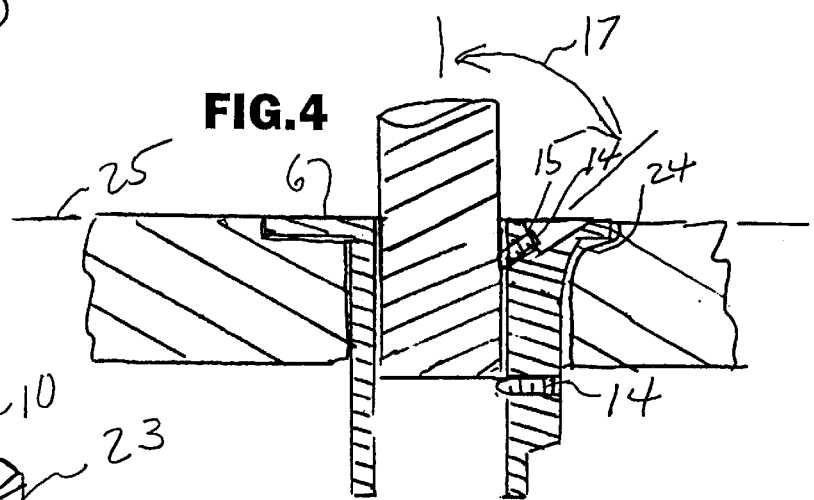
FIG. 4 is a sectional view taken through line 4—4 of FIG. 2.

In addition to the configuration shown on FIG. 3, wherein the connector lies entirely atop the support surface, the connector 1 may serve another purpose as exemplified in FIG. 4. When it is desired to leave the support surface unobstructed when the rod is removed, the connector may be mounted inverted in a recess or cavity 24 in the support surface with the flat first face 6 lying in a common plane 25 with the support surface. When the support surface is a wooden deck, for example, the recess may be routed out, and the screw 14 advanced to serve as a stop to limit the penetration of the rod in the passage. When the connector is to be embedded in concrete, the screw may be retracted until it extends beyond the boss to serve as an anchor in the concrete. An at-least-partially-threaded second aperture 15 passes from the first face to the central passage for insertion of another set screw 14 for removably securing the rod in this configuration. It is disposed at an acute angle 17 to the central axis 10 of the passage so that it is accessible from the surface.

Figure 5:
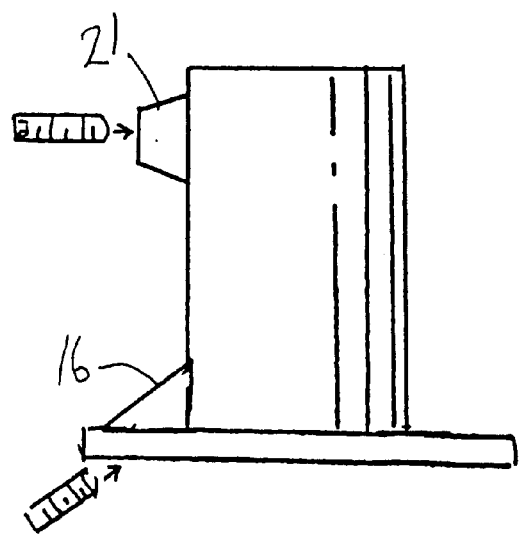
FIG. 5 is a front elevation view of another embodiment of the invention.

Referring now to FIG. 5, another embodiment of the invention provides two individual bosses 21 and 16 to support the threaded apertures.

Figure 6:
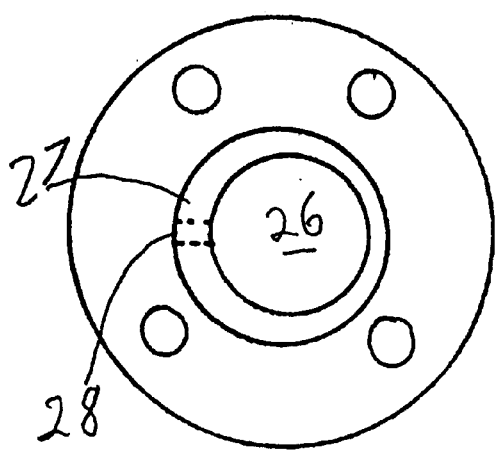
FIG. 6 is a top view of another embodiment of the invention.

Referring now to FIG. 6, another embodiment of the invention is shown in which the central passage 26 is not centered, to provide a thicker side wall 27 for supporting the threaded apertures 28.

Figure 7:
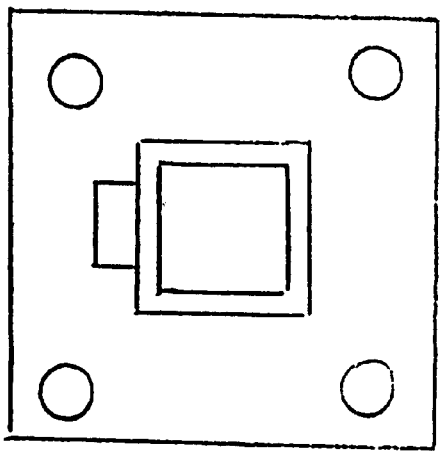
FIG. 7 is a top view of another embodiment of the invention.

Referring now to FIG. 7, another embodiment of the invention is shown for supporting an elongate member that is rectangular in cross section.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A dual purpose connector for removably fastening an elongate cylindrical member to a flat support surface, the connector comprising:
   a) a broad rigid base having a substantially planar first face and an opposed second face;
   b) a tubular member extending away from the second face and terminating in a free end;
   c) a cylindrical central passage extending from the free end through the tubular member and the base to the first face, the central passage dimensioned for receiving therein the cylindrical member and having a central axis substantially orthogonal to the first face;
   d) an at-least-partially-threaded first aperture having an axis transverse to the central axis passing through a side wall of the tubular member for receiving a threaded fastener therein for securing the elongate cylindrical member in the central passage when the first face is fastened to the flat support surface with the tubular member upstanding; and e) an at-least-partially-threaded second aperture having an axis disposed at an acute angle to the central axis passing from the first face to the central passage for receiving a threaded fastener therein for securing the elongate cylindrical member in the central passage when the connector is mounted with the first face disposed in a substantially common plane with the flat support surface and the tubular member beneath that plane.

2. The connector according to claim further comprising a plurality of fastener-receiving apertures extending between the first and second faces.

3. The connector according to claim 2 further comprising at least one boss disposed along one side of the tubular member through which the at-least-partially-threaded apertures pass.

4. The connector according to claim 1 further comprising at least one boss disposed along one side of the tubular member through which the at-least-partially-threaded apertures pass.

5. A dual purpose connector for removably fastening an elongate member to a flat support surface, the connector comprising:

a) a broad rigid base having a substantially planar first face and an opposed second face;

b) a tubular member extending away from the second face and terminating in a free end;

c) a central passage extending from the free end through the tubular member and the base to the first face, the central passage dimensioned for receiving therein the elongate member and having a central axis substantially orthogonal to the first face;

d) an at-least-partially-threaded first aperture having an axis transverse to the central axis passing through a side wall of the tubular member for receiving a threaded fastener therein for securing the elongate member in the central passage when the first face is fastened to the flat support surface with the tubular member upstanding; and e) an at-least-partially-threaded second aperture having an axis disposed at an acute angle to the central axis passing from the first face to the central passage for receiving a threaded fastener therein for securing the elongate member in the central passage when the connector is mounted with the first face disposed in a substantially common plane with the flat support surface and the tubular member beneath that plane.

6. The connector according to claim 5 further comprising a plurality of fastener-receiving apertures extending between the first and second faces.

7. The connector according to claim 6 further comprising at least one boss disposed along one side of the tubular member through which the at-least-partially-threaded apertures pass.

8. The connector according to claim 5 further comprising at least one boss disposed along one side of the tubular member through which the at-least-partially-threaded apertures pass.

* * * * *